United States Patent [19]

Harper, Sr.

[11] 4,267,992
[45] May 19, 1981

[54] TIRE/WHEEL CONCEPT

[75] Inventor: Philip M. Harper, Sr., Bellevue, Wash.

[73] Assignee: The United States of America as represented by the Administrator of the National Aeronautics and Space Administration, Washington, D.C.

[21] Appl. No.: 103,836

[22] Filed: Dec. 12, 1979

Related U.S. Application Data

[63] Continuation of Ser. No. 893,865, Apr. 16, 1978, abandoned.

[51] Int. Cl.³ .................... B64C 25/32; B60C 5/00
[52] U.S. Cl. .................... 244/103 R; 152/330 RF; 152/353 R; 152/353 G; 152/379.4; 244/130
[58] Field of Search ............ 152/378 R, 379.1, 396, 152/402, 404, 405, 366, 383, 330 RF, 352, 353, 354, 379.3, 379.4; 301/39 RT, 63 DS, 63 D; 244/50, 100 R, 102 R, 103 R, 130

[56] References Cited

U.S. PATENT DOCUMENTS

| | | | |
|---|---|---|---|
| 511,698 | 12/1893 | Iddon | 152/378 R |
| 558,957 | 4/1896 | Jeffery | 152/378 R |
| 1,189,223 | 7/1916 | Albrecht | 152/330 RF |
| 1,563,811 | 12/1925 | Wagenhorst | 152/378 R |
| 1,921,772 | 8/1933 | Paull | 152/379.1 |
| 2,367,825 | 1/1945 | Shaw | 301/63 DS |
| 3,482,806 | 12/1969 | Trautesch et al. | 244/103 R |
| 3,850,217 | 11/1974 | Edwards et al. | 152/330 RF |
| 3,850,218 | 11/1974 | Bertelli et al. | 152/353 G |
| 3,857,427 | 12/1974 | Soucek | 152/196 |
| 3,930,527 | 1/1976 | French | 152/330 RF |
| 4,059,138 | 11/1977 | Mirtain et al. | 152/353 R |
| 4,102,379 | 7/1978 | Kamiya | 152/405 |
| 4,105,254 | 8/1978 | Corner et al. | 301/63 DS |

FOREIGN PATENT DOCUMENTS 513117  10/1952  Belgium .......................... 152/379.1

Primary Examiner—John E. Kittle
Attorney, Agent, or Firm—Howard J. Osborn; John R. Manning

[57] ABSTRACT

A tire and wheel assembly is disclosed in which a low profile pneumatic tire having sidewalls which deflect inwardly under load and a wheel having a rim featuring a narrow central channel and extended rim flanges form the combination. The extended rim flanges support the tire sidewalls under static and dynamic loading conditions to produce a combination particularly suited to aircraft applications.

11 Claims, 5 Drawing Figures

TIRE/WHEEL CONCEPT

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

This is a continuation, of application Ser. No. 893,865, filed Apr. 16, 1978, now abandoned.

BACKGROUND OF THE INVENTION

This invention relates to an improved tire and wheel assembly for aircraft wherein a tire having sidewalls which collapse inwardly under load and a wheel featuring extended rim flanges for the sidewall support are used in combination.

DESCRIPTION OF THE PRIOR ART

The use of pneumatic tire and wheel assemblies on aircraft is well known, the assemblies providing the means for landing, taxiing and stopping an aircraft. With the development of modern aircraft featuring thin wing sections, an improved tire and wheel assembly able to perform the functions of a conventional assembly while reducing or eliminating the need for wing surface bulges for vertically stowed wheels as well as reducing the drag profile of the wheel well area has become highly desirable.

While prior attempts to accomplish these ends involved the use of low profile (LXX) tires on conventional rims, the poor side stability caused by excess cantilevering of the tire sidewalls made them undesirable.

U.S. Pat. No. 3,850,218 to Bertelli et al discloses a tire design and construction. However, the combination of that tire with a rim which functions as a support surface for the tire sidewall under load is not taught.

Other prior art relating to the field of the invention includes U.S. Pat. No. 511,698 to Iddon, U.S. Pat. No. 558,957 to Jeffery and U.S. Pat. No. 1,563,811 to Wagenhorst. The Iddon patent discloses an extended rim flange on a vehicle wheel. The flange, however, supports only limited tire sidewall area and remains in contact with that fixed area independent of the load on the tire and therefore does not anticipate the functions performed by the instant wheel with its extended rim. Both the Iddon patent and the Jeffery patent disclose a narrow channel for seating the tire bead, but since the width of the rim channel is dictated by the width of the tire tread face, of conventional tires, neither patent anticipates a narrow channel with extended rim flanges in combination with a tire having a proportionately large tread width. The Wagenhorst patent appears to disclose a rim having extended flanges in its FIG. 6. In fact, the figure depicts a stage in the manufacture of a wheel rim having a final configuration capable of providing bead seating and support only.

Numerous patents for tire and wheel assemblies which have "run-flat" capabilities exist, examples of which are U.S. Pat. No. 3,857,427 to Soucek where reinforced sidewalls and an inner support ring permit tire usage under deflated conditions and U.S. Pat. No. 3,850,217 to Edwards et al where a composition is released upon tire deflation to seal and lubricate the tire. In both instances the "run-flat" capability was a specific criterion of the assembly design, whereas the "run-flat" capability was not the primary purpose of the invention. Furthermore, it accomplishes this result without the use of any ancillary equipment since, upon deflation, the tire simply deflates against the rim flanges which maintain tire position and prevent sidewall damage.

It is therefore an object of the present invention to disclose a tire and wheel combination able to perform the functions of a conventional assembly while reducing the total assembly diameter required for a given unit load thereby reducing or eliminating wing surface bulges for vertically stowed wheels as well as reducing the drag profile of the wheel well area.

A further object of the present invention is to increase the total shock strut/tire efficiency.

An additional object of the present invention is to increase the space available within the boundary defined by the wheel rim for the stowage of brakes by reducing the width of the bead seat channel.

Another object of the present invention is to provide an assembly having "run-flat" capability even under dynamic loading.

These and other advantages of the invention will be readily apparent when considered in reference to the description and claims and taken in connection with the attached drawings to which they relate.

SUMMARY OF THE INVENTION

In the present invention an aircraft quality wheel has a tire of nonconventional design mounted thereon. The wheel is of modified two-piece construction to permit installation and removal of the tire bead from the rim channel and is manufactured from alloys presently employed in conventional wheel manufacture. The wheel rim has a narrow central channel for tire bead seating and extended rim flanges for tire sidewall support.

Tire beads are seated in the narrow rim channel and comprise the sole means attaching the tire to the rim. The tire is pneumatic having a tread provided with an annular inextensible structure, and possesses the feature that its sidewalls work under compression since each sidewall is positioned by the edge of the annular inextensible structure and by the rim which prevent the sidewalls from reversing their sense of curvature. The sidewalls comprise moreover at least one portion whose resistance to flexion is smaller than that of the remaining sidewall portions.

In use the assembly is deployed in the same manner as would be a conventional assembly. Upon the application of a load, the tire is compressed causing its sidewalls to flex about the channel lips and be pressed against the extended rim flanges. Increased loads cause a greater portion of the sidewalls to come into contact with the extended rim flanges. In this way, sidewall flexion is limited, the sidewalls gaining support from the flanges and the rim flanges becoming a means for transferring tread loads directly to the shock strut. Side stability of the assembly results from the low profile of the tire, the rim flanges acting as a boundary surface to limit sidewall cantilever.

DESCRIPTION OF THE PREFERRED EMBODIMENT

Figure 1:
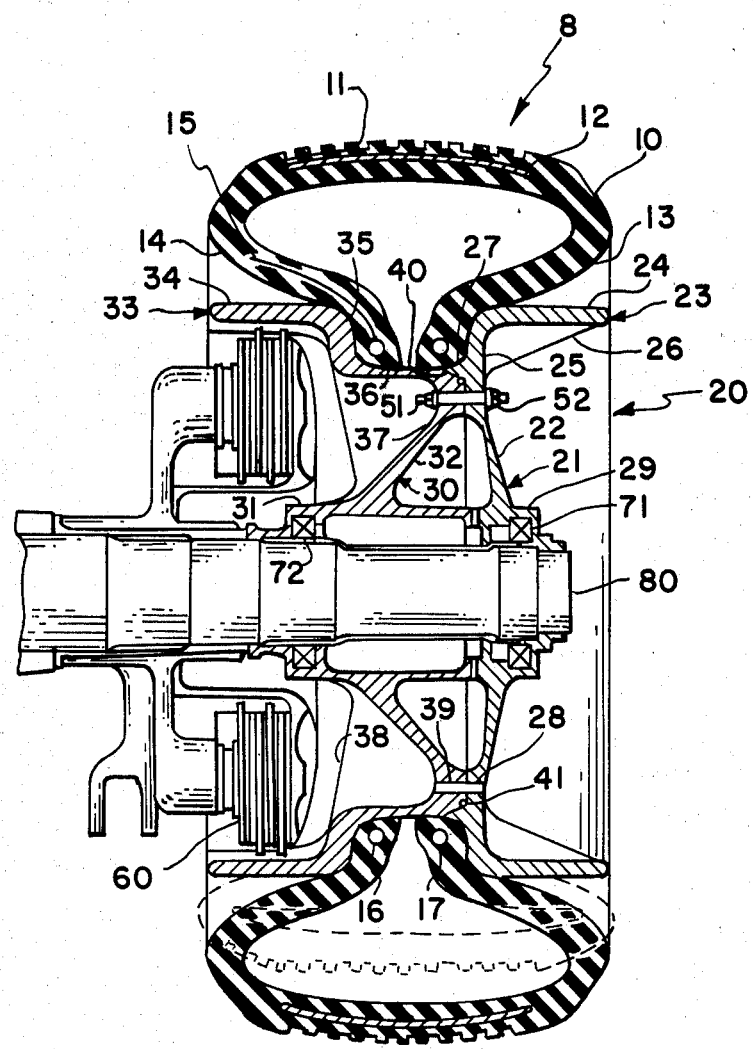
FIG. 1 is a cross-sectional view of the improved tire and wheel assembly.
Figure 2:
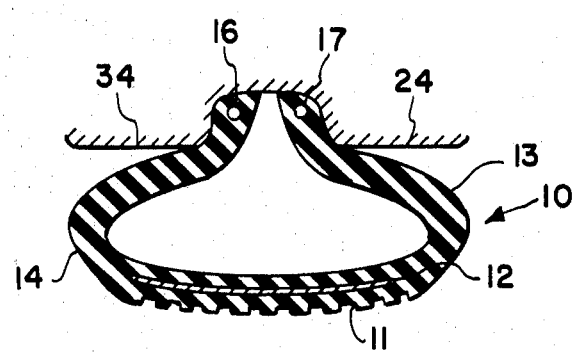
FIG. 2 is a cross-sectional diagrammatic view showing the shape of the tire with respect to the wheels in an unloaded condition.

Referring now to the drawings, there is shown a preferred embodiment of the invention in FIG. 1 showing a tire and wheel assembly designated generally by the reference numeral 8. The invention is basically comprised of a tire 10 and a two-piece wheel 20.

The wheel is of a two-piece design having an outside rim-and-spider half 21. The spider half 21 has a hub section 29, spokes 22 formed integral therewith and spaced at equal intervals thereabout, connected to the rim generally designated by the reference numeral 23. The rim 23 appears generally L-shaped in cross-section and has a leg or flange 24 which projects outwardly to a position such that the end thereof coincides with the outside of the tire sidewall. A number of fillets 26 are formed between leg 24 and leg 25 to strengthen leg 24. The leg 25 has a lip 27 extending inwardly about the circumference thereof to mate with a shoulder on the other wheel half to be explained more fully hereinafter. Apertures 28 are provided in the lower portion of the leg section to accommodate bolts for fastening the wheel halves together.

The other wheel half 30 has a hub section 31, spokes 32 formed integral therewith and spaced at equal intervals thereabout, connected to the rim generally 33. The rim 33 is stepped in cross-section and has a leg or flange 34 which projects inwardly to a position such that its end coincides with the inside of the tire sidewall. The leg 34 is integral with a riser section 35, which is integral with a platform section 36, that is integral with the other leg section 37, connected to the spokes 32. Fillets 38 connect the platform section 36, the legs 37 and the spokes 32 to strengthen the rim. The legs 37 are provided with apertures 39 to receive the bolts 51. The bolts 51 pass through both apertures 28 and 39 to connect the wheel halves together. Nuts 52 are threaded on the bolts 51 in a conventional manner to lock the wheel halves together, and can be removed for ease of mounting the tire.

The platform section 36 has an annular recess 40 formed therein which is designed to mate with the lip 27 of the other wheel half. An "O"-ring seal 41 is placed in the recess 40 and engaged by the lip 27 to provide an airtight arrangement to seal the rim halves should a tubeless tire be utilized. The leg 25, lip 27, platform section 36, and riser section 35 form a generally "U"-shaped channel for receiving the beads of the tire in a conventional manner. The distance between the riser section 35 and the leg 25 is approximately fifty percent less than in a conventional rim because of the type of tire the invention rim is to be used with.

Figure 3:
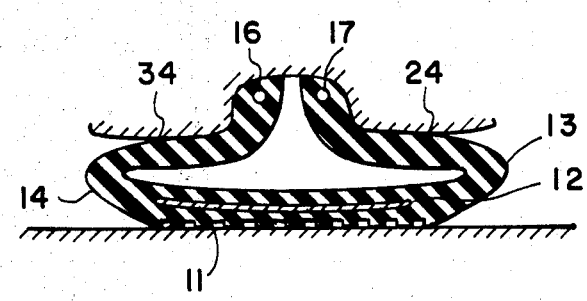
FIG. 3 is a cross-sectional diagrammatic view showing the shape of the tire with respect to the wheel under static load conditions.
Figure 4:
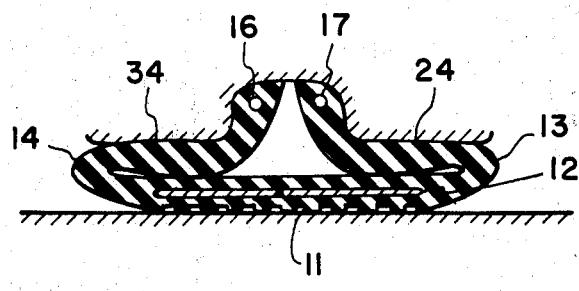
FIG. 4 is a cross-sectional diagrammatic view showing the shape of the tire with respect to the wheel under dynamic load conditions.

The tire 10 is comprised of a tread 11 provided with an annular inextensible structure 12 and two sidewalls 13 and 14. Each sidewall has beads 16 and 17 at the lower extremities, a section midline 15 which is curved and has a concavity directed outwardly even under the action of the normal inflation pressure. The design is such that the sidewalls are under compression rather than tension providing a precompressed structure. The tread of the tire is reinforced having a given width being wider than any other part of the tire. The tread is reinforced over substantially the whole width by the annular inextensible structure 12. Under tire inflation pressure, the member 12 is inextensible in both thhe lateral and circumferential directions. The sidewalls 13 and 14 are S-shaped in cross section between the edge of the tread and the bead. Each sidewall is concave outward from the tread to the section midline 15, and concave inward to the bead, under all loading conditions. This configuration comprises the folding means of claim 3. Each of the sidewalls has in combination a stiffness, curvature and thickness sufficient to constrain the sidewall between the side edges of the inextensible tread reinforcement and the bead seat riser 35 and leg 27 of the wheel rim. The sidewalls have one end zone with a bending stiffness lower than the stiffness of the remaining sidewall area. On one of the surfaces of the sidewall, grooves are present. The pitch and angle of the grooves define a plurality of ribs which propagate the stresses exerted on the sidewalls. The tire sidewalls are constructed to deflect approximately thirty-two percent under static load, thus retaining flex capability during taxiing to produce a smooth ride, FIG. 3; then bottom out against the extended rim flanges at approximately fifty percent deflection, FIG. 4 to eliminate the tire as a shock absorbing member under dynamic loads.

Figure 5:
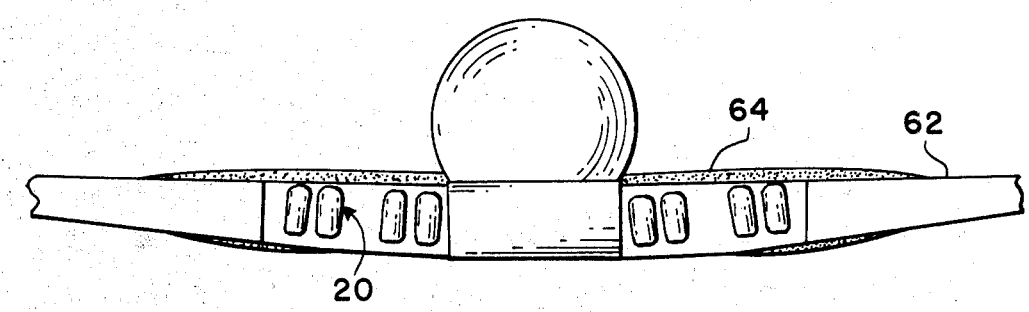
FIG. 5 is a wing body section showing the invention tire and wheel combination stored in the vertical position, the added shaded area indicating the wing size necessary to house a conventional tire and wheel assembly.

As FIG. 1 shows, the narrow rim channel, distance between leg 25 and riser 35, frees space within the rim flange which permits use of a rotor and stator stack 60 of greater height and fewer components compared to the conventional arrangement, resulting in increased efficiency of the brakes. Only the size and increased per-unit effectiveness aspects of the brake assembly may be employed. Furthermore, the low assembly are part of the present invention. Any suitable brake assembly profile reduces the wing thickening required to house the improved wheel in the area of the wheel wells, thus reducing the drag profile of this area. A comparison of the solid area 62 which will house the invention assembly, with the solid area 62 and shaded area 64 needed to house a conventional wheel assembly, FIG. 5, illustrates this improvement. The reduction in total frontal area is approximately 7.5 percent over a conventional wheel and tire assembly. The hub portions 29 and 31 of the wheel 20 rotate on bearings 71 and 72 which are journaled on a wheel spindle 80 of the aircraft in a conventional manner.

The embodiment described above is merely exemplary, and those skilled in the art will be able, upon consideration of this disclosure, to make many modifications therein within the spirit and scope of the invention.

What is claimed is:

1. An aircraft and tire-wheel combination comprising:
   an aircraft having wings with wheel wells situated therein;
   means for reducing wing drag profile in the area of said wheel wells including;
   a tire having beads, a tread area and inner connecting sidewalls, said sidewalls constructed to fold laterally along their midpoint lines to a degree dependent upon loading;

a wheel having a tire bead retaining channel and leg means extending axially outward from the channel, said leg means constructed to abut, support, and complement the tire sidewall under various loading conditions, under severe dynamic loading the tire sidewalls meeting and shocks being transmitted directly from the ground through the sidewalls to the said leg means; and braking means with surface area dependent upon the axial length of said wheel channel and the radius of the wheel; said wheel channel being narrow in axial length and said wheel large in radius.

2. A tire/wheel combination for aircraft landing gear as in claim 1 including means by which the tire bottoms out on the leg means at approximately fifty percent deflection.

3. A tire/wheel combination for aircraft landing gear as in claim 1 wherein said tire sidewalls include folding means allowing the tire to bottom on the leg means increasing total shock strut efficiency during dynamic loading.

4. A tire/wheel combination for aircraft landing gear as in claim 1 wherein said wheel is of two part construction; and includes means for sealing the parts of said wheel to enable use of a tubeless tire therewith.

5. A tire/wheel combination for aircraft landing gear as in claim 4 wherein said means for sealing is an "O"-ring seal.

6. A tire/wheel combination for aircraft landing gear as in claim 1 wherein said leg means extend outwardly parallel to the wheel axis from the channel to a point where the extremities thereof approximately coincide with the fold lines of the sidewalls of said tires under varying loading conditions.

7. A tire/wheel combination for aircraft landing gear as in claim 1 wherein the tire is constructed to bottom out on the leg means at approximately fifty percent tire deflection.

8. A tire/wheel combination for aircraft landing gear as in claim 1 wherein said channel is generally "U"-shaped, having a width substantially less than the width of the tire tread, and said leg means extend outwardly parallel to the wheel axis on either side from the channel sufficiently far that the outer edges of the wheel rim do not puncture or indent the sidewalls even under severe loading completely bottoming out the tire.

9. A tire/wheel combination for aircraft landing gear as in claim 6 wherein said wheel channel is narrow having a width substantially less than the width of the tire tread.

10. A tire/wheel combination for aircraft landing gear as in claim 9 wherein said wheel is of two part construction and includes fastening means for readily joining and separating the parts of the wheel to facilitate tire mounting, and means for sealing the parts of the wheel to enable use of a tubeless tire therewith.

11. A tire/wheel combination as in claim 1 wherein said tire sidewalls' radial height, and with it the outside diameter of the tire, is reduced, allowing the tire/wheel assembly to be stowed in a smaller wheel well.

* * * * *